(12) United States Patent
Gomadam et al.

(10) Patent No.: US 9,124,327 B2
(45) Date of Patent: Sep. 1, 2015

(54) CHANNEL FEEDBACK FOR COOPERATIVE MULTIPOINT TRANSMISSION

(75) Inventors: Krishna Srikanth Gomadam, Santa Clara, CA (US); Yan Zhang, Palo Alto, CA (US); Adoram Erell, Herzlia (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 443 days.

(21) Appl. No.: 13/433,293

(22) Filed: Mar. 29, 2012

(65) Prior Publication Data
US 2012/0250550 A1  Oct. 4, 2012

Related U.S. Application Data

(60) Provisional application No. 61/470,235, filed on Mar. 31, 2011.

(51) Int. Cl.
| | |
|---|---|
| H04B 7/06 | (2006.01) |
| H04B 7/02 | (2006.01) |
| H04B 7/04 | (2006.01) |
| H04W 52/40 | (2009.01) |

(52) U.S. Cl.
CPC .............. H04B 7/0626 (2013.01); H04B 7/024 (2013.01); H04B 7/0623 (2013.01); H04B 7/0417 (2013.01); H04W 52/40 (2013.01)

(58) Field of Classification Search
None
See application file for complete search history.

(56) References Cited

U.S. PATENT DOCUMENTS

| | | |
|---|---|---|
| 5,231,629 A | 7/1993 | Kotzin et al. |
| 5,263,160 A | 11/1993 | Porter, Jr. et al. |
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

U.S. Appl. No. 12/965,878 Notice of Allowance dated Feb. 10, 2014.

(Continued)

*Primary Examiner* — Ian N Moore
*Assistant Examiner* — Brian T Le

(57) ABSTRACT

A method for mobile telecommunication includes receiving in a mobile communication terminal downlink signals from at least first and second cells that coordinate transmission of the downlink signals with one another. Channel feedback is calculated in the terminal based on the received downlink signals. The channel feedback is configured to enable the first cell to precode a first signal destined for the terminal in response to the channel feedback with a first precoding vector, and to enable the second cell to precode a second signal destined for the terminal in response to the channel feedback with a second precoding vector that differs in magnitude from the first precoding vector. The first and second signals convey same data. The channel feedback is transmitted from the terminal. Calculating the channel feedback includes calculating one or more of a single-user Channel Quality Indicator (CQI), a multi-user CQI, and a non-cooperative-transmission CQI.

16 Claims, 1 Drawing Sheet

(56) References Cited

U.S. PATENT DOCUMENTS

| | | |
|---|---|---|
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 8,515,435 B2 | 8/2013 | Krasny et al. |
| 8,559,879 B2 * | 10/2013 | Bhushan et al. ............ 455/63.1 |
| 8,565,808 B2 | 10/2013 | Hosono et al. |
| 8,694,017 B2 | 4/2014 | Bhushan |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0201407 A1 | 8/2007 | Borran et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0245195 A1 | 10/2009 | Bhattad et al. |
| 2009/0247084 A1 | 10/2009 | Palanki |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0009634 A1 | 1/2010 | Budianu et al. |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0113078 A1 | 5/2010 | Farajidana et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273495 A1 | 10/2010 | Onggosanusi et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 | 11/2010 | Lee et al. |
| 2010/0309861 A1 | 12/2010 | Gorokhov et al. |
| 2011/0013710 A1 * | 1/2011 | Xiao ............................ 375/260 |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0034192 A1 | 2/2011 | Lim et al. |
| 2011/0044193 A1 | 2/2011 | Forenza et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 * | 4/2011 | Jongren et al. ................ 375/267 |
| 2011/0085610 A1 * | 4/2011 | Zhuang et al. ................ 375/260 |
| 2011/0086663 A1 | 4/2011 | Gorokhov et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0134774 A1 | 6/2011 | Pelletier et al. |
| 2011/0150052 A1 | 6/2011 | Erell et al. |
| 2011/0158190 A1 | 6/2011 | Kuwahara et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0176439 A1 * | 7/2011 | Mondal et al. ................ 370/252 |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0199986 A1 | 8/2011 | Fong et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |

(56) References Cited

U.S. PATENT DOCUMENTS

| | | | |
|---|---|---|---|
| 2011/0261775 A1 | 10/2011 | Kim et al. | |
| 2011/0268204 A1 | 11/2011 | Choi et al. | |
| 2011/0274188 A1 | 11/2011 | Sayana et al. | |
| 2011/0306341 A1 | 12/2011 | Klein et al. | |
| 2012/0002568 A1 | 1/2012 | Tiirola et al. | |
| 2012/0002743 A1* | 1/2012 | Cavalcante et al. | 375/267 |
| 2012/0003926 A1 | 1/2012 | Coldrey et al. | |
| 2012/0008556 A1 | 1/2012 | Noh et al. | |
| 2012/0020433 A1 | 1/2012 | Bhattad et al. | |
| 2012/0028628 A1 | 2/2012 | Frenger et al. | |
| 2012/0033592 A1 | 2/2012 | Kim et al. | |
| 2012/0033630 A1 | 2/2012 | Chung et al. | |
| 2012/0034927 A1 | 2/2012 | Papasakellariou et al. | |
| 2012/0039369 A1 | 2/2012 | Choi et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0076028 A1 | 3/2012 | Ko et al. | |
| 2012/0076038 A1 | 3/2012 | Shan et al. | |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0188976 A1 | 7/2012 | Kim et al. | |
| 2012/0213261 A1* | 8/2012 | Sayana et al. | 375/224 |
| 2012/0219042 A1 | 8/2012 | Onggosanusi et al. | |
| 2012/0219083 A1 | 8/2012 | Tong et al. | |
| 2012/0257664 A1 | 10/2012 | Yue et al. | |
| 2012/0275376 A1 | 11/2012 | Sampath et al. | |
| 2012/0275386 A1 | 11/2012 | Frenne et al. | |
| 2012/0281620 A1 | 11/2012 | Sampath et al. | |
| 2012/0287799 A1 | 11/2012 | Chen et al. | |
| 2012/0329502 A1 | 12/2012 | Frederiksen et al. | |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0077595 A1 | 3/2013 | Aiba et al. | |
| 2013/0083681 A1 | 4/2013 | Ebrahimi Tazeh Mahalleh et al. | |
| 2013/0088978 A1 | 4/2013 | Mondal et al. | |
| 2013/0107916 A1 | 5/2013 | Liu et al. | |
| 2013/0114427 A1 | 5/2013 | Maattanen et al. | |
| 2013/0114428 A1 | 5/2013 | Koivisto et al. | |
| 2013/0114431 A1 | 5/2013 | Koivisto | |
| 2013/0128847 A1 | 5/2013 | Wang et al. | |
| 2013/0176991 A1 | 7/2013 | Yi | |
| 2013/0182786 A1 | 7/2013 | Frenne et al. | |
| 2013/0250885 A1 | 9/2013 | Davydov et al. | |
| 2013/0272221 A1 | 10/2013 | Hoehne et al. | |
| 2014/0029568 A1 | 1/2014 | Wang et al. | |
| 2014/0029586 A1 | 1/2014 | Loehr et al. | |
| 2014/0051357 A1 | 2/2014 | Steer et al. | |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
3rd Generation Partnership Project; Technical Specification Group Radio Access Network; Requirements for Further Advancements for Evolved Universal Terrestrial Radio Access (E-Utra) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DoCoMo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.

(56) References Cited

OTHER PUBLICATIONS

Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DoCoMo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Re1.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WG1 #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
Alcatel-Lucent et al., "Way Forward on Enhancement for Re1.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 13/409,130, filed Mar. 1, 2012.
U.S. Appl. No. 61/568,588, filed Dec. 8, 2011.
Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
U.S. Appl. No. 61/558,405, filed Nov. 10, 2011.
U.S. Appl. No. 61/556,752, filed Nov. 7, 2011.
U.S. Appl. No. 61/585,556, filed Jan. 11, 2012.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT DoCoMo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
U.S. Appl. No. 12/965,878 Office Action dated Oct. 24, 2013.
U.S. Appl. No. 13/052,075 Notice of Allowance dated Nov. 8, 2013.
U.S. Appl. No. 13/543,835 Office Action dated Nov. 22, 2013.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.

(56) References Cited

OTHER PUBLICATIONS

Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4x2 and 4x4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT DoCoMo et al., "Prioritized Deployment Scenarios for LTE-Advanced Studies", 3GPP TSG RAN WG4 Meeting #50, Athens, Greece, Feb. 9-13, 2009.
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8x8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit-Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, "Notion of Anchor Carrier in LTE-A", 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT DoCoMo, 3GPP TSG RAN WG1, "Views on Scalable CSI Feedback for DL CoMP in LTE-Advanced", Meeting #58bis, R1-094243, pp. 1-5, Oct. 12-16, 2009.
NTT DoCoMo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.
JP Patent Application # 2011-551560 Office Action dated Oct. 29, 2013.

(56) References Cited

OTHER PUBLICATIONS

JP Patent Application # 2012-506601 Office Action dated Oct. 22, 2013.
U.S. Appl. No. 13/672,727 Office Action dated Sep. 19, 2014.
European Application # 12765629 Search Report dated Aug. 5, 2014.
U.S. Appl. No. 13/610,904 Office Action dated Oct. 7, 2014.
U.S. Appl. No. 13/610,904 Office Action dated May 1, 2014.
U.S. Appl. No. 13/346,737 Office Action dated Dec. 24, 2014.
U.S. Appl. No. 13/610,904 Office Action dated Mar. 4, 2015.
U.S. Appl. No. 13/862,422 Office Action dated Feb. 12, 2015.

* cited by examiner

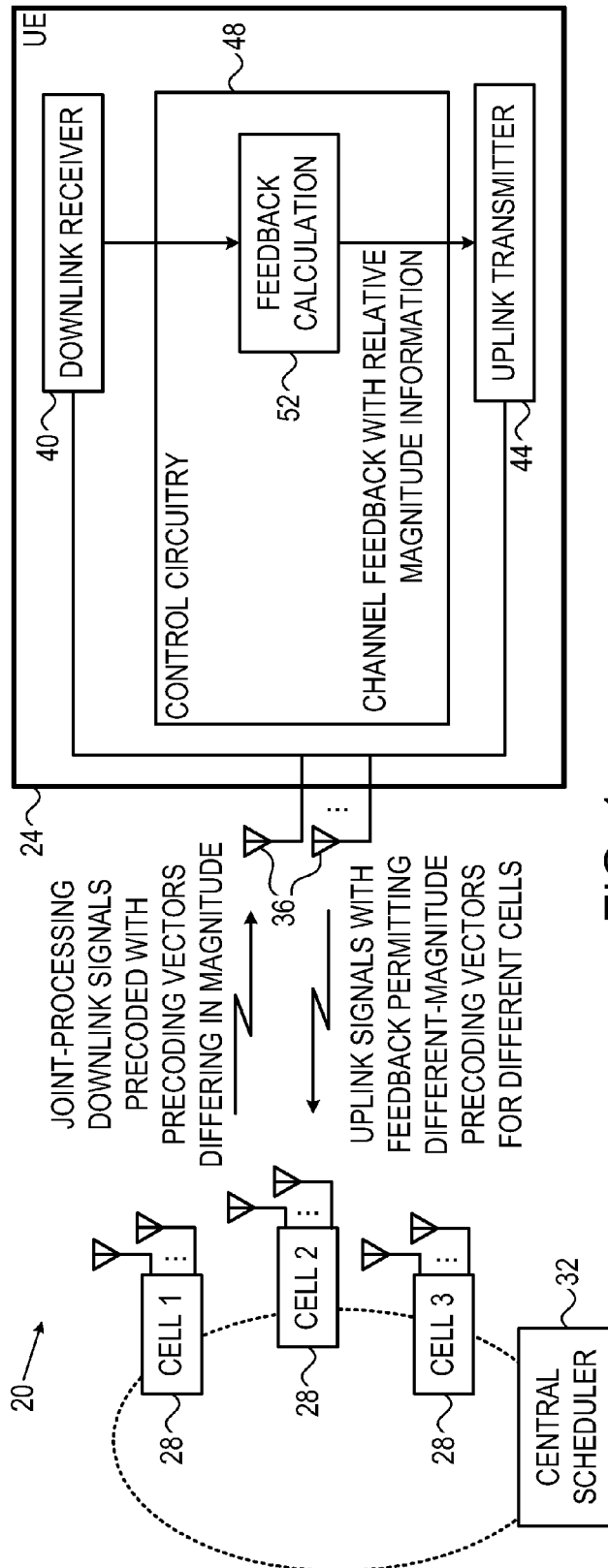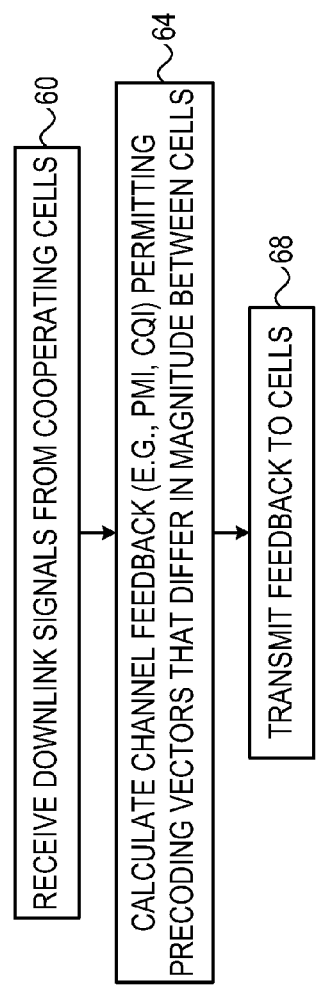

CHANNEL FEEDBACK FOR COOPERATIVE MULTIPOINT TRANSMISSION

CROSS-REFERENCE TO RELATED APPLICATIONS

This application claims the benefit of U.S. Provisional Patent Application 61/470,235, filed Mar. 31, 2011, whose disclosure is incorporated herein by reference.

FIELD OF THE DISCLOSURE

The present invention relates generally to wireless communication, and particularly to methods and systems for feedback in cooperative multipoint transmission systems.

BACKGROUND

Some Multiple-Input Multiple-Output communication systems use Cooperative Multipoint (CoMP) transmission for coordinating MIMO transmissions between cells. For example, in a mode known as Joint Processing (JP), multiple cells transmit the same data simultaneously to a User Equipment (UE) terminal. When using the JP mode, the cooperating cells typically configure their transmissions based on channel feedback provided by the UEs. Various feedback schemes for JP transmission are known in the art.

For example, 3GPP Technical Specification Group Radio Access Network (TSG-RAN) WG1 document R1-110743, entitled "Preliminary CoMP JP Results for Homogenous Networks," Taipei, Taiwan, Feb. 21-25, 2011, which is incorporated herein by reference, provides simulated evaluation results for CoMP JP based on a Minimal Mean Square Error (MMSE) receiver.

TSG-RAN WG1 document R1-110628, entitled "Performance Evaluation of Phase 1: Downlink Homogeneous Network with High Tx Power RRHs," Taipei, Taiwan, Feb. 21-25, 2011, which is incorporated herein by reference, provide CoMP evaluation results in Frequency Division Duplex (FDD) and Time Division Duplex (TDD). Additional simulation results are provided in TSG-RAN WG1 document R1-111139, entitled "Initial CoMP Evaluation for Homogeneous Network with High Tx Power RRHs," Taipei, Taiwan, Feb. 21-25, 2011, which is incorporated herein by reference.

The description above is presented as a general overview of related art in this field and should not be construed as an admission that any of the information it contains constitutes prior art against the present patent application.

SUMMARY

An embodiment that is described herein provides a method, which includes receiving in a mobile communication terminal downlink signals from at least first and second cells that coordinate transmission of the downlink signals with one another. Channel feedback is calculated in the terminal based on the received downlink signals. The channel feedback is configured to cause the first cell to precode subsequent downlink signals in response to the channel feedback with a first precoding vector, and to cause the second cell to precode the subsequent downlink signals in response to the channel feedback with a second precoding vector that differs in magnitude from the first precoding vector. The channel feedback is transmitted from the terminal.

In some embodiments, calculating the channel feedback includes calculating the channel feedback that causes the first cell to transmit the subsequent downlink signals to the terminal at a first power level, and that causes the second cell to transmit the subsequent downlink signals to the terminal at a second power level that is different from the first power level. In an embodiment, calculating the channel feedback includes calculating different first and second recommended magnitudes for the first and second precoding vectors, respectively. In another embodiment, calculating the channel feedback includes calculating a Channel Quality Indicator (CQI) under a constraint that permits the first and second cells to select the first and second precoding vectors with different magnitudes.

In yet another embodiment, calculating the channel feedback includes calculating one or more of: a single-user CQI calculated under a first constraint that no additional downlink signals to other terminals are scheduled simultaneously with the downlink signals addressed to the terminal; a multi-user CQI calculated under a second constraint that additional downlink signals to one or more other terminals are scheduled simultaneously with the downlink signals addressed to the terminal; and a non-cooperative-transmission CQI calculated under a third constraint that the first and second cells do not coordinate the transmission with one another.

In a disclosed embodiment, receiving the downlink signals includes receiving a Joint-Processing (JP) transmission in which the same data is transmitted simultaneously to the terminal by the first and second cells using the respective first and second precoding vectors. In an alternative embodiment, receiving the downlink signals includes receiving a coordinated beamforming transmission in which interference to the terminal is controlled by use of the first and second precoding vectors.

In some embodiments, calculating the channel feedback includes computing the channel feedback based on channel information that is available both to the terminal and to the cells, under an assumption that the first and second cells will select the first and second precoding vectors based on the channel information with different magnitudes.

There is additionally provided, in accordance with an embodiment that is described herein, apparatus including a receiver, control circuitry and a transmitter. The receiver is configured to receive downlink signals from at least first and second cells that coordinate transmission of the downlink signals with one another. The control circuitry is configured to calculate channel feedback that is configured, based on the received downlink signals, to cause the first cell to precode subsequent downlink signals in response to the channel feedback with a first precoding vector, and to cause the second cell to precode the subsequent downlink signals in response to the channel feedback with a second precoding vector that differs in magnitude from the first precoding vector. The transmitter is configured to transmit the channel feedback.

In some embodiments, a mobile communication terminal includes the disclosed apparatus. In some embodiments, a chipset for processing signals in a mobile communication terminal includes the disclosed apparatus.

There is further provided, in accordance with an embodiment that is described herein, a method including receiving in a mobile communication terminal a Joint-Processing (JP) transmission in which the same data is transmitted simultaneously to the terminal by at least first and second cells. Channel feedback is calculated in the terminal based on the received JP transmission. The channel feedback is configured to cause the first cell to transmit subsequent JP transmissions to the terminal at a first power level, and to cause the second cell to transmit the subsequent JP transmissions to the terminal at a second power level that is different from the first power level. The channel feedback is transmitted from the terminal.

In some embodiments, calculating the channel feedback includes calculating different first and second recommended magnitudes for the first and second precoding vectors, respectively, and transmitting the channel feedback includes indicating the first and second recommended magnitudes to the cells.

The present disclosure will be more fully understood from the following detailed description of the embodiments thereof, taken together with the drawings in which:

BRIEF DESCRIPTION OF THE DRAWINGS

FIG. 1 is a block diagram that schematically illustrates a communication system that uses Cooperative Multipoint (CoMP) transmission, in accordance with an embodiment that is described herein; and FIG. 2 is a flow chart that schematically illustrates a method for providing channel feedback in a communication system that uses CoMP transmission, in accordance with an embodiment that is described herein.

DETAILED DESCRIPTION OF EMBODIMENTS

In a typical Joint Processing (JP) system, multiple cells transmit the same data to a communication terminal using multiple respective precoded downlink signals. The cells apply suitable precoding vectors and suitable phase differences between the downlink signals of different cells so as to create a virtual high-order MIMO transmission. The cooperating cells (or a central scheduler such as may be associated with network, for example) typically select the precoding vectors in response to channel feedback provided by the terminal. In conventional JP schemes, all the cooperating cells transmit a given JP transmission at the same power level, i.e., all the precoding vectors participating in the JP transmission have the same magnitude.

In practice, however, it is possible to improve the system performance considerably if different cells have the freedom to use precoding vectors of different magnitudes in the same JP transmission. Example simulation results showing such performance improvement are presented in U.S. Provisional Patent Application 61/470,235, cited above and incorporated herein by reference in its entirety.

Embodiments that are described herein provide improved feedback schemes and precoding schemes for use in Coordinated Multipoint (CoMP) systems. In some embodiments, a mobile communication terminal receives downlink signals from at least two cooperating cells. The terminal calculates channel feedback, which will cause the cells to precode a subsequent JP transmission to the terminal with respective precoding vectors that differ in magnitude from one another. The terminal reports the channel feedback over an uplink channel, and the cooperating cells (or the central scheduler) use the reported feedback for selecting precoding vectors in subsequent JP transmissions to the terminal.

In some embodiments, the channel feedback comprises explicit Magnitude Information (MI) that is indicative of recommended ratios between the precoding vector magnitudes of the cooperating cells. In other embodiments, the magnitude information is fed back implicitly, e.g., using long-term channel information that is available to both the terminal and the cells.

Several examples of channel feedback types and corresponding precoder configurations are described herein. A generalization of the disclosed techniques to Coordinated Beamforming (CB) CoMP is also described.

FIG. 1 is a block diagram that schematically illustrates a communication system 20 that uses Cooperative Multipoint (COMP) transmission, in accordance with an embodiment that is described herein. In the present example, system 20 operates in accordance with Third Generation Partnership Project (3GPP) Long Term Evolution (LTE) or LTE-Advanced (LTE-A) specifications. In alternative embodiments, system 20 may operate in accordance with any other suitable communication protocol in which cells coordinate transmission with one another.

In the embodiment of FIG. 1, system 20 comprises a mobile communication terminal 24 (referred to in LTE-A terminology as User Equipment—UE) and three cells 28 (base stations) denoted CELL1, CELL2 and CELL3. This choice to show three cells is made, however, purely by way of example. In real-life configurations, system 20 typically comprises a large number of cells, some of which may be collocated, and a large number of terminals. UE 24 may comprise, for example, a cellular phone, a wireless-enabled computing device or any other suitable type of communication terminal.

In CoMP terminology, the cells are referred to as Channel State Information—Reference Signal resource (CSI-RS resource). The terms CSI-RS resource, cell and base station are therefore used interchangeably herein. A given cell 28 may comprise multiple transmitters, such as one or more macro-cells, micro-cells, pico-cells and/or femto-cells. The multiple transmitters in a given cell typically have the same cell ID and may be undistinguishable from one another to the UEs.

Each cell 28 transmits downlink MIMO signals to UEs 24 using multiple transmit antennas. At least some of the downlink signals are precoded (also referred to as beam-formed). In an embodiment, cells 28 support a Joint Processing (JP) mode in which two or more of the cells simultaneously transmit precoded downlink signals that carry the same data to UE 24. This form of cooperation creates a high-order MIMO transmission using multiple cells.

In this embodiment, system 20 comprises a central scheduler 32, which schedules the transmissions of the various cells to the various terminals, and calculates precoding vectors (i.e., sets of complex weights to be applied to the signals transmitted via the respective transmit antennas), to be applied by the cells when transmitting JP transmissions. Central scheduler 32 typically calculates the precoding vectors based on channel feedback that is received from the UEs. Example schemes for providing such feedback are described in detail below.

In the embodiment of FIG. 1, UE 24 comprises one or more antennas 36, a downlink receiver 40, an uplink transmitter 44 and control circuitry 48. Receiver 40 receives downlink signals from one or more cells 28 via antennas 36, and decodes downlink data from the received downlink signals. Transmitter 44 produces uplink signals that convey uplink data to cells 28, and transmits the uplink signals to the cells.

Control circuitry 48 manages operation of UE 24. In an embodiment, the control circuitry comprises a feedback calculation unit 52 that calculates, based on received downlink signals, channel feedback indicative of the communication channels between cells 28 and UE 24. Typically, the feedback calculation unit calculates the feedback based on non-precoded downlink signals. Control circuitry 48 provides the channel feedback to uplink transmitter 44, and the uplink transmitter transmits the channel feedback over the uplink to cells 28.

As will be explained in detail below, the channel feedback produced by unit 52 permits the cells to transmit a given JP transmission using power levels that differ from one cell to another. In other words, the channel feedback is not calculated under a constraint that cells 28 will all use the same transmission power when generating the JP transmission.

In an embodiment, the channel feedback conveys magnitude information that is configured to cause the cells to apply precoding vectors that differ in magnitude when transmitting a given JP transmission. (In different embodiments, cells 28 set their transmission power in different ways, not necessarily using the precoding operation. In the present context, the terms "precoding vector magnitude" and "cell transmission power" are used interchangeably. The channel feedback is regarded as causing the cells to apply precoding vectors that differ in magnitude, even though the cells may use other mechanisms for setting their transmission power.)

In an embodiment, the feedback is transmitted from UE 24 to the cell that currently serves the UE and/or to any other suitable cell or cells. The feedback, or the information conveyed therein, is distributed to cells 28 and/or to central scheduler 32, for use in subsequent precoding.

The UE configuration shown in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and control circuitry 48, are implemented in hardware, such as implementing receiver 40 and/or transmitter 44 using one or more Radio Frequency Integrated Circuits (RFICs), or implementing control circuitry 48 using one or more Field-Programmable Gate Arrays (FPGAs) or Application-Specific Integrated Circuits (ASICs). In alternative embodiments, certain elements of UE 24 are implemented in software, or using a combination of hardware and software elements.

In some embodiments, certain UE elements, such as certain elements of control circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In many practical scenarios, the performance of system 20 can be improved if the cooperating cells are not constrained to all transmit with the same power level in a given JP transmission. U.S. Provisional Patent Application 61/470,235, cited above and incorporated herein by reference in its entirety, presents simulation results showing considerable improvement in downlink throughput when the equal-power constraint is removed.

Thus, in some embodiments, UE 24 calculates and reports channel feedback that is configured to cause cells 28 to transmit JP transmissions with precoding vectors that differ in magnitude from one cell to another. In these embodiments, for a given JP transmission, the magnitude of the precoding vector of one cell is specific for that cell and is not necessarily the same as the magnitude of the precoding vectors used by other cells (although it may incidentally be the same in some scenarios). In other words, the UE calculates the channel feedback under an assumption that the cooperating cells are permitted to (and will) apply precoding vectors that differ in magnitude.

In a conventional precoding scheme, for the case of two cooperating cells, the $i^{th}$ UE recommends that the cells use the following JP zero-forcing precoder:

$$u_i = \begin{bmatrix} v_{1i} \\ e^{j\theta} v_{2i} \end{bmatrix} \qquad \text{Equation 1}$$

wherein $v_{1i}$ and $v_{2i}$ denote the precoding vectors to be applied by the first and second cells, respectively, and $\theta$ denotes a phase offset between the signals of the first and second cells.

Assuming central scheduler 32 schedules two UEs in the JP mode, the zero-forcing precoder is given by:

$$U_{ZF} = U(UU^+)^{-1}, \; U = [u_1 u_2] \qquad \text{Equation 2}$$

wherein columns $u_1$ and $u_2$ of matrix U denote the JP precoding vectors for the first and second UEs, respectively, and $()^+$ denotes the Hermitian (conjugate transpose) operator. Matrix U, and thus $U_{ZF}$, can be normalized to meet various power constraints, such as a certain power level per UE or per transmission point.

In some embodiments, the JP precoder that is applied jointly by the cooperating cells has the following form:

$$W = T(TT^+ + \alpha I)^{-1} \qquad \text{Equation 3}$$

wherein $T = [D_1 u_1 \; D_2 u_2]$, $\alpha$ denotes a regularization factor and I denotes an identity matrix. Matrix $D_1$ comprises a diagonal matrix that scales the individual precoders applied by the cooperating cells for the first UE, so as to create a non-uniform transmission power allocation among the cells.

The number of distinct elements in $D_1$ is N−1, wherein N denotes the number of cooperating cells that transmit the JP transmission. Matrix $D_2$ comprises a diagonal matrix that carries out a similar function for the second scheduled UE.

In some embodiments, when permitting different cooperating cells to transmit with different power levels, the precoder recommended by UE 24 takes the form:

$$v = \begin{bmatrix} e^{j\theta_1} m_1 v_1 \\ e^{j\theta_2} m_2 v_2 \\ \ldots \\ e^{j\theta_N} m_N v_N \end{bmatrix} \qquad \text{Equation 4}$$

In these embodiments, feedback calculation unit 52 calculates channel feedback that comprises a Precoding Matrix Indicator (PMI) that recommends a normalized precoding vector for each cooperating cell—corresponding to $v_i$, Phase Change Information (PCI) that recommends phase differences between the signals of different cells—corresponding to $\theta_i$, and Magnitude Information (MI) that recommends relative magnitudes for the signals of the cooperating cells—corresponding to $m_i$.

In an embodiment, the PCI and MI values in the channel feedback are reported relative to the signal of the serving cell. In these embodiments, there is no need to report PCI and MI values for the serving cell. In various embodiments, the PCI and MI values are reported in the feedback in different ways, for example independently or differentially.

The range of MI for a given cell typically depends on the allowed difference in Reference Signal Received Power (RSRP) between that cell and the serving cell. In an example embodiment, if the allowed difference in RSRP is 3 dB, then unit 52 selects the MI value from a 1-bit codebook of $10^{-0.1}$ and $10^{-0.15}$. This operation is similar to quantizing the MI value over the range of allowed power levels.

In some embodiments, after feedback calculation unit 52 calculates the joint precoder, unit normalizes (scales) the precoder to unit norm. This normalization results in a total power allocation of $\Sigma_i m_i^2 P_i$ to the $i^{th}$ transmission, wherein $P_i$ denotes the transmission power of the $i^{th}$ cooperating cell.

In alternative embodiments, feedback calculation unit 52 may calculate and report the PMI, PCI and/or MI value in any other suitable way that permits different cooperating cells to apply different-magnitude precoding vectors in a JP transmission.

In various embodiments, feedback calculation unit 52 calculates and reports one or more Channel Quality Indicators (CQIs) based on the received downlink signals. In an embodiment, unit 52 calculates and reports a Single-User CQI (SU CQI), under a hypothesis that no other transmissions to other UEs are scheduled during the JP transmission to UE 24. Under this hypothesis, the signal received in UE 24 is given by $$y = [H_{11} \ H_{12}] \begin{bmatrix} v_1 \\ e^{j\theta} m v_2 \end{bmatrix} = Hvx + n \qquad \text{Equation 5}$$

wherein $H_{11}$ and $H_{12}$ respectively denote the channel between the UE and the two cooperating cells (cell-1 and cell-2).

Additionally or alternatively, in some embodiments unit 52 calculates and reports a Multi-User CQI (MU CQI), under a hypothesis that one or more other transmissions to other UEs (whose directional information is unknown) are scheduled during the JP transmission to UE 24. The effect of the other co-scheduled transmissions is statistically equivalent to a single directional interference, as demonstrated below:

$$y = \frac{1}{\sqrt{1+m^2}} [H_{11} \ H_{12}] \begin{bmatrix} v_1 \\ e^{j\theta} m v_2 \end{bmatrix} x_1 + [H_{11} \ H_{12}] Tx_2 + n = \qquad \text{Equation 6}$$

$$Hvx_1 + [H_{11} \ H_{12}] \begin{bmatrix} T_1 \\ T_2 \end{bmatrix} x_2 + n$$

wherein T denotes the unknown precoder representing the other co-scheduled transmissions.

In an embodiment, unit 52 assumes that the individual precoders that make-up T are distributed isotropically over the directions that are orthogonal to the corresponding individual precoders in v. Moreover, unit 52 assumes that the total interference power from the $i^{th}$ cell is $(1-m_i^2)P_i$. In the above example, the precoder $T_1$ can take any direction that is orthogonal to $v_1$, and the total power is given by $(1-1/\sqrt{1+m^2})P_i$.

Under these assumptions, unit 52 typically calculates the Signal to Noise Ratio (SNR) that is used in producing and reporting the MU CQI. Example SNR calculation that can be used for this purpose, as well as other aspects of MU CQI, are described in U.S. patent application Ser. No. 13/253,078, entitled "Enhanced Channel Feedback for Multi-User MIMO," whose disclosure is incorporated herein by reference.

Further additionally or alternatively, in some embodiments unit 52 calculates and reports a non-CoMP CQI without assuming CoMP operation of the cells, e.g., based on the serving cell PMI and CQI.

In alternative embodiments, unit 52 may calculate the SU-CQI, MU-CQI and/or non-CoMP CQI in any other suitable way. As can be seen in the above equations, all the disclosed CQI types (SU CQI, MU CQI and non-CoMP CQI) are calculated under an assumption that the cooperating cells are permitted to (and will) apply precoding vectors that differ in magnitude. In various embodiments, unit 52 calculates and reports one or two CQI types from among the SU-CQI, MU-CQI and non-CoMP CQI, or even all three CQI types.

FIG. 2 is a flow chart that schematically illustrates a method for providing channel feedback in system 20, in accordance with an embodiment that is described herein. The method begins with receiver 40 of UE 24 receiving downlink signals from cells 28, at a reception operation 60.

Feedback calculation unit 52 in control circuitry 48 calculates channel feedback based on the received downlink signals, at a feedback calculation operation 64. The channel feedback is calculated under an assumption that the cells have the freedom to transmit subsequent JP transmissions to the UE using power levels (e.g., using precoding vectors) that do not all have the same magnitude. In various embodiments, the channel feedback comprises any of the feedback types described above—for example PMI/PCI/MI and/or SU CQI, MU CQI and/or non-CoMP CQI.

Transmitter 44 transmits the channel feedback over the uplink, at a feedback reporting operation 68. Central scheduler 32 uses the reported channel feedback to configure the precoding vectors applied by the cooperating cells in subsequent JP transmissions to UE 24. In some cases, the precoding vectors of different cells in a given JP transmission differ in magnitude as a result of the feedback.

In some embodiments, UE 24 calculates and reports feedback that causes the cooperating cells to apply different-magnitude precoding vectors implicitly, i.e., without explicitly requesting the desired magnitude relationships. This technique reduces uplink overhead, since it does not require explicit transmission of magnitude information (e.g., the MI values defined above).

In an example embodiment, control circuitry 48 measures the received signal strength of reference signals from the various cooperating cells (RSRP measurements), and reports the measured signal strengths or the ratios between them to the serving cell. In this embodiment, both the UE and the central scheduler use this feedback for calculating the JP precoding vectors. The UE uses the ratios between RSRP measurements of different cells to calculate the recommended precoding vectors. The central scheduler uses the ratios between RSRP measurements to calculate the actual precoding vectors, while permitting different-magnitude precoding vectors, and without requiring an explicit request from the UE for the different magnitudes.

In this embodiment, unit 52 in UE 24 typically calculates and reports PMI and PCI, but not MI. The JP precoder recommended by the UE takes the form:

$$v = \begin{bmatrix} e^{j\theta_1} d_1 v_1 \\ e^{j\theta_2} d_2 v_2 \\ \ldots \\ e^{j\theta_N} d_N v_N \end{bmatrix} \qquad \text{Equation 7}$$

wherein $d_i$ is given by $d_i = \sqrt{RSRP_i/RSRP_{serving\_cell}}$. In general, $d_i$ can be defined as any suitable function of the the RSRP of the $i^{th}$ cell ($RSRP_i$) and the RSRP of the serving cell, i.e., $d_i = f(RSRP_i, RSRP_{serving\_cell})$. In one example embodiment, unit 52 uses codebook-based quantization of the relative RSRP level.

In an example embodiment, the cooperating cells (referred to as a reporting set) is configured semi-statically: The UE measures the RSRP levels of the neighboring (strongest) cells and feeds back the information to the serving cell. The serving cell then determines the reporting set and configures the UE to measure the CSI-RS of the cells in the reporting set.

In the present example, the cooperating cells apply different-magnitude precoding vectors using implicit magnitude feedback that is based on RSRP measurements for different cells. Generally, however, the cooperating cells may use any other suitable long-term information regarding the communication channels between the cells and the UE for this purpose.

The embodiments described above refer mainly to JP CoMP. The disclosed feedback techniques, however, are also applicable, for example, to Coordinated Beamforming (CB) CoMP in which the cooperating cells coordinate transmission of beamformed downlink signals with one another in order to reduce interference.

For example, let $u_1$ denote a precoding vector directed from a certain cell to UE 24, and let $u_2$ denote a precoding vector directed from the same cell to another, co-scheduled UE. A conventional CB zero forcing precoder in this case would give the precoder for UE 24 as the first column of $U_{ZF} = U(UU^+)^{-1}$, $U = [u_1\ u_2]$, as in Equation 2 above. In some embodiments, the CB precoder is given by the first column of $W = T(TT^+ + \alpha I)^{-1}$ wherein $T = [d_1 u_1\ d_2 u_2]$, as in Equation 3 above. The values of $d_1$ and $d_2$ can be obtained from explicit feedback from UE 24 or from long-term channel information (e.g., RSRP measurements reported by the UE).

Although the embodiments described herein mainly address JP transmission in LTE and LTE-A systems, the methods and systems described herein can also be used in other applications, such as in any coordinated transmission scheme in which two or more transmitters have relative magnitude information relating to a communication terminal.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for mobile telecommunication, comprising:
   receiving in a mobile communication terminal downlink signals from at least first and second cells that coordinate transmission of the downlink signals with one another;
   in the terminal, calculating channel feedback that is configured, based on the received downlink signals, to be used by the first and second cells in precoding a joint downlink transmission, which is transmitted jointly to the terminal from the first and second cells, the channel feedback calculated in the terminal being such that the first cell is enabled to precode a first signal destined for the terminal using a first precoding vector, the second cell is enabled to precode a second signal that is also destined for the terminal using a second precoding vector that differs in magnitude from the first precoding vector, and the first and second signals convey same data; and
   transmitting the channel feedback from the terminal,
   wherein calculating the channel feedback comprises calculating different first and second recommended magnitudes for the first and second precoding vectors, respectively, and calculating one or more of:
   a single-user Channel Quality Indicator (CQI) calculated under a first constraint that no additional downlink signals to other terminals are scheduled simultaneously with the joint downlink transmission addressed to the terminal;
   a multi-user CQI calculated under a second constraint that additional downlink signals to one or more other terminals are scheduled simultaneously with the joint downlink transmission addressed to the terminal; and
   a non-cooperative-transmission CQI calculated under a third constraint that the first and second cells do not coordinate the transmission with one another.

2. The method according to claim 1, wherein calculating the channel feedback comprises calculating the channel feedback that causes the first cell to transmit the joint downlink transmission to the terminal at a first power level, and that causes the second cell to transmit the joint downlink transmission to the terminal at a second power level that is different from the first power level.

3. The method according to claim 1, wherein calculating the channel feedback comprises calculating a Channel Quality Indicator (CQI) under a constraint that permits the first and second cells to select the first and second precoding vectors with different magnitudes.

4. The method according to claim 1, wherein receiving the downlink signals comprises receiving a Joint-Processing (JP) transmission in which the same data is transmitted simultaneously to the terminal by the first and second cells using the respective first and second precoding vectors.

5. The method according to claim 1, wherein receiving the downlink signals comprises receiving a coordinated beamforming transmission in which interference to the terminal is controlled by use of the first and second precoding vectors.

6. The method according to claim 1, wherein calculating the channel feedback comprises computing the channel feedback based on channel information that is available both to the terminal and to the cells, under an assumption that the first and second cells will select the first and second precoding vectors based on the channel information with different magnitudes.

7. Apparatus, comprising:
   a receiver, which is configured to receive downlink signals from at least first and second cells that coordinate transmission of the downlink signals with one another;
   control circuitry, which is configured to calculate channel feedback that is configured, based on the received downlink signals, to be used by the first and second cells in precoding a joint downlink transmission, which is transmitted jointly to the apparatus from the first and second cells, such that the first cell is enabled to precode a first signal destined for the apparatus using a first precoding vector, the second cell is enabled to precode a second signal that is also destined for the apparatus using a second precoding vector that differs in magnitude from the first precoding vector, and the first and second signals convey same data; and a transmitter, which is configured to transmit the channel feedback, wherein the control circuitry is configured to calculate the channel feedback by calculating different first and second recommended magnitudes for the first and second precoding vectors, respectively, and calculating one or more of:

a single-user Channel Quality Indicator (CQI) calculated under a first constraint that no additional downlink signals to other receivers are scheduled simultaneously with the joint downlink transmission addressed to the receiver;

a multi-user CQI calculated under a second constraint that additional downlink signals to one or more other receivers are scheduled simultaneously with the joint downlink transmission addressed to the receiver; and a non-cooperative-transmission CQI calculated under a third constraint that the first and second cells do not coordinate the transmission with one another.

8. The apparatus according to claim 7, wherein the control circuitry is configured to calculate the channel feedback so as to cause the first cell to transmit the joint downlink transmission to the receiver at a first power level, and to cause the second cell to transmit the joint downlink transmission to the receiver at a second power level that is different from the first power level.

9. The apparatus according to claim 7, wherein the control circuitry is configured to calculate a Channel Quality Indicator (CQI) under a constraint that permits the first and second cells to select the first and second precoding vectors with different magnitudes.

10. The apparatus according to claim 7, wherein the receiver is configured to receive a Joint-Processing (JP) transmission in which the same data is transmitted simultaneously to the apparatus by the first and second cells using the respective first and second precoding vectors.

11. The apparatus according to claim 7, wherein the receiver is configured to receive a coordinated beamforming transmission in which interference to the receiver is controlled by use of the first and second precoding vectors.

12. The apparatus according to claim 7, wherein the control circuitry is configured to calculate the channel feedback based on channel information that is available both to the control circuitry and to the cells, under an assumption that the first and second cells will select the first and second precoding vectors based on the channel information with different magnitudes.

13. A mobile communication terminal comprising the apparatus of claim 7.

14. A chipset for processing signals in a mobile communication terminal, comprising the apparatus of claim 7.

15. A method for mobile telecommunication, comprising:

receiving in a mobile communication terminal a Joint-Processing (JP) transmission in which same data is transmitted simultaneously to the terminal by at least first and second cells;

in the terminal, calculating based on the received JP transmission channel feedback that is configured to be used by the first and second cells in precoding a subsequent JP transmission, which is transmitted jointly to the terminal from the first and second cells, the channel feedback calculated in the terminal being such that the first cell is enabled to precode a first signal destined for the terminal using a first precoding vector, the second cell is enabled to precode a second signal that is also destined for the terminal using a second precoding vector that differs in power level from the first precoding vector, and the first and second signals convey the same data; and transmitting the channel feedback from the terminal, wherein calculating the channel feedback comprises calculating different first and second recommended power levels for the first and second precoding vectors, respectively, and calculating one or more of:

a single-user Channel Quality Indicator (CQI) calculated under a first constraint that no additional downlink signals to other terminals are scheduled simultaneously with the JP transmission addressed to the terminal;

a multi-user CQI calculated under a second constraint that additional downlink signals to one or more other terminals are scheduled simultaneously with the JP transmission addressed to the terminal; and a non-cooperative-transmission CQI calculated under a third constraint that the first and second cells do not coordinate the transmission with one another.

16. The method according to claim 15, wherein calculating the channel feedback comprises calculating different first and second recommended magnitudes for the first and second precoding vectors, respectively, and wherein transmitting the channel feedback comprises indicating the first and second recommended magnitudes to the cells.

\* \* \* \* \*